United States Patent
Arkfeld et al.

(10) Patent No.: US 11,803,958 B1
(45) Date of Patent: Oct. 31, 2023

(54) SYSTEMS AND METHODS FOR DETERMINING MUSCLE FASCICLE FRACTURING

(71) Applicant: Triumph Foods LLC, St. Joseph, MO (US)

(72) Inventors: Emily Arkfeld, St. Joseph, MO (US); Barry Wiseman, Olathe, KS (US); Matt England, Kansas City, MO (US)

(73) Assignee: TRIUMPH FOODS LLC, St. Joseph, MO (US)

( * ) Notice: Subject to any disclaimer, the term of this patent is extended or adjusted under 35 U.S.C. 154(b) by 0 days.

(21) Appl. No.: 18/048,646

(22) Filed: Oct. 21, 2022

Related U.S. Application Data

(60) Provisional application No. 63/270,330, filed on Oct. 21, 2021.

(51) Int. Cl.
*G06T 7/00* (2017.01)

(52) U.S. Cl.
CPC .. *G06T 7/0008* (2013.01); *G06T 2207/20081* (2013.01); *G06T 2207/30128* (2013.01)

(58) Field of Classification Search
CPC ......... G06T 7/0008; G06T 2207/20081; G06T 2207/30128
See application file for complete search history.

(56) References Cited

U.S. PATENT DOCUMENTS

| | | | |
|---|---|---|---|
| 4,226,540 A | 10/1980 | Barten et al. | |
| 4,908,703 A | 3/1990 | Jensen et al. | |
| 5,944,598 A | 8/1999 | Tong et al. | |
| 6,099,473 A | 8/2000 | Liu et al. | |
| 6,104,827 A | 8/2000 | Benn et al. | |
| 6,198,834 B1 | 3/2001 | Belk et al. | |
| 6,317,516 B1 | 11/2001 | Thomsen et al. | |
| 6,751,364 B2 | 6/2004 | Haagensen et al. | |
| 6,891,961 B2 | 5/2005 | Eger et al. | |

(Continued)

FOREIGN PATENT DOCUMENTS

| CA | 2906948 C | 11/2021 |
|---|---|---|
| EP | 2972152 A4 | 2/2018 |

(Continued)

OTHER PUBLICATIONS

Sun et al., Prediction of pork loin quality using online computer vision system and artificial intelligence model, Meat Science, 2018, pp. 72-77, vol. 140, Elsevier Ltd.

(Continued)

*Primary Examiner* — Vincent Rudolph
*Assistant Examiner* — Raphael Schwartz
(74) *Attorney, Agent, or Firm* — Husch Blackwell LLP

(57) ABSTRACT

The disclosure relates to methods and systems for determining muscle fascicle fracturing in a meat sample. In one embodiment, the methods and systems disclosed herein use automated methods to determine muscle fascicle fracturing. Methods and systems disclosed herein comprise imaging a meat sample with an imaging device to obtain one or more images; and using an iteratively trained training detection model to determine an objective classification, including the presence or absence of muscle fascicle fracturing in the images of the meat sample.

20 Claims, 4 Drawing Sheets
(1 of 4 Drawing Sheet(s) Filed in Color)

(56) References Cited

U.S. PATENT DOCUMENTS

| | | | |
|---|---|---|---|
| 7,929,731 | B2 | 4/2011 | Schimitzek |
| 8,260,005 | B2 | 9/2012 | Tomic et al. |
| 8,774,469 | B2 | 7/2014 | Subbiah et al. |
| 9,546,904 | B2 | 1/2017 | Pawluczyk et al. |
| 9,546,968 | B2 | 1/2017 | Cooke |
| 10,458,965 | B1 | 10/2019 | Iyer |
| 10,806,153 | B2 | 10/2020 | Hanning et al. |
| 2003/0072472 | A1* | 4/2003 | Haagensen ............ A22B 5/007 382/110 |
| 2011/0007151 | A1 | 1/2011 | Goldberg |
| 2011/0069872 | A1 | 3/2011 | Martel et al. |
| 2011/0128373 | A1 | 6/2011 | Goldberg |
| 2019/0110638 | A1 | 4/2019 | Li et al. |
| 2021/0015113 | A1 | 1/2021 | Aggarwal et al. |
| 2022/0108447 | A1* | 4/2022 | Kayser ................... A61B 5/445 |
| 2022/0323997 | A1 | 10/2022 | Pawluczyk et al. |

FOREIGN PATENT DOCUMENTS

| | | |
|---|---|---|
| EP | 3830550 A4 | 3/2022 |
| EP | 4018180 A1 | 6/2022 |
| MX | 2007010351 A | 1/2009 |
| WO | 9114180 A1 | 9/1991 |
| WO | 2004017067 A2 | 2/2004 |
| WO | 2009087258 A1 | 7/2009 |
| WO | 2014139003 A1 | 9/2014 |
| WO | 2018078582 A1 | 5/2018 |
| WO | 2019232113 A1 | 12/2019 |
| WO | 2020035813 A1 | 2/2020 |
| WO | 2020064075 A1 | 4/2020 |
| WO | 2020104636 A1 | 5/2020 |
| WO | 2021033012 A1 | 2/2021 |
| WO | 2021033033 A1 | 2/2021 |

OTHER PUBLICATIONS

Sun et al., Prediction of pork color attributes using computer vision system, Meat Science, 2016, pp. 62-64, vol. 113, Elsevier Ltd.

Sun et al., Prediction of Pork Color Grade using Image Two-tone Color Ratio Features and Support Vector Machine, Advance Journal of Food Science and Technology, 2016, pp. 593-598, vol. 11(9), Maxwell Scientific Publication Dorp.

Sun et al., Prediction of Pork Fatty Acid Content using Image Texture Features, Advance Journal of Food Science and Technology, 2016, pp. 644-647, vol. 12(11), Maxwell Scientific Publication Corp.

Liu, Jeng-Hung, Computer Vision System as a Tool to Estimate Pork Marbling, A Dissertation Submitted to the Graduate Faculty of the North Dakota State University of Agriculture and Applied Science, Jun. 2017, 96 pages.

* cited by examiner

MFF PRESENT
NO MFF
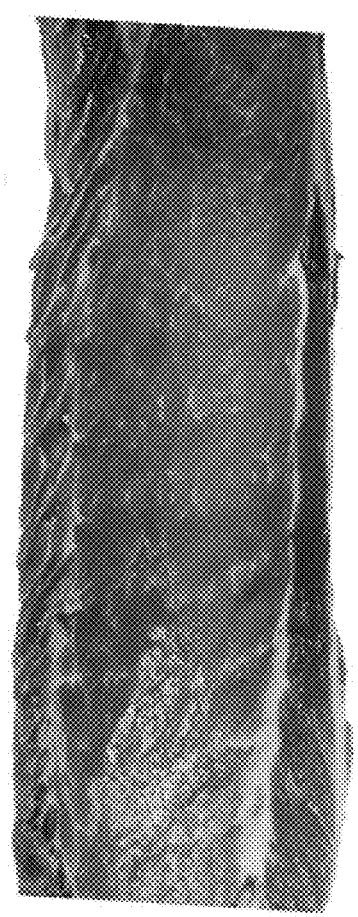
FIG. 2A
FIG. 2B

SYSTEMS AND METHODS FOR DETERMINING MUSCLE FASCICLE FRACTURING

CROSS-REFERENCE TO RELATED APPLICATIONS

This Application claims priority to U.S. Provisional Patent Application Ser. No. 63/270,330, filed on Oct. 21, 2021, to Emily Arkfeld et. al., entitled "Systems and Methods for Determining Muscle Fascicle Fracturing," currently pending, the entire disclosure of which is incorporated herein by reference.

BACKGROUND OF THE INVENTION

The field of the present invention relates generally to systems and methods for detecting and classifying muscle fascicle fracturing in meat cuts.

The increase in competition in global pork markets is a result of free trade agreements among countries. Pork imports and exports in each country are now part of international trade, rather than simply domestic pork supply and demand. Japan has remained a key country for the importation of U.S. pork since the 1990s. Japan's swine industry has encountered obstacles, such as increased production costs and environmental limitations, which has created a situation wherein Japan now relies on the increased importation of pork to supply its demand.

Swine production is about 21% of total livestock production in Japan. Pork is a key component of Japanese consumers' diets. Japanese pork primal cuts are similar to standard primal cuts in the United States. However, the use of the cuts in Japan differs from the traditional U.S. uses. Two of the most well-known pork dishes in Japan are Tonkatsu (breaded pork cutlet) and Shabu-shabu (thinly sliced meat cooked in hot broth), which are prepared from Boston butt and loin.

Muscle fascicle fracturing ("MFF"), also referred to as broken texture, is a quality concern of particular concern for Japanese exports. A description of typical muscle architecture is provided for context. First, the sarcomere is the smallest contractile unit of muscle and is comprised of proteins. Several sarcomeres together formulate a myofibril. Multiple myofibrils can be bound together to form a muscle fiber. Several muscle fibers (cells) together form a muscle bundle. When cutting meat, the fascicles form the visible "grain" of the meat. A muscle is formed by multiple muscle fascicles. The collagen network that supports myofibrils is the endomysium. The collagen network that supports muscle fascicles is the perimysium. In addition to poor product appearance, MFF results in lower slicing yield of Shabu-shabu products.

Accordingly, a need exists for an automated, objective, efficient, and accurate identification of muscle fascicle fracturing. A further need exists for an objective classification method that provides an assessment of the meat samples(s).

BRIEF SUMMARY OF THE INVENTION

The present invention is directed generally to systems and methods for determining muscle fascicle fracturing. The system can be provided in the form of an MFF detection system designed to determine the MFF in a meat sample using an advanced training model and provide an objective pass/fail classification.

According to a first embodiment, a muscle fascicle fracturing detection system can include a data capture device provided in the form of a camera and a transport system with a meat sample positioned in a field of view of the camera. The system can further include a detection model with a processor designed to process a plurality of data elements received from the data capture device and determine an objective classification of the muscle fascicle fracturing of the meat sample. In some embodiments, the system can further comprise a notification system designed to generate a notification provided in the form of the objective classification of the muscle fascicle fracturing of the meat sample. In some embodiments, the objective classification can include a presence or an absence of muscle fascicle fracturing of the meat sample. In some embodiments, the detection model can include an iteratively trained machine learning model or can include a training model, a validation model, and a trained model. In some embodiments, the plurality of data elements is provided in the form of high-resolution images. In some embodiments, the meat sample can be a pork loin.

According to a second embodiment, a method for determining muscle fascicle fracturing of a meat sample comprises capturing a data element provided in the form of an image of a meat sample. The method can further include extracting an attribute from the image of the meat sample and processing the attribute using an iteratively trained training detection model. The iteratively trained training detection model can determine an objective classification of the muscle fascicle fracturing of the meat sample. In one embodiment, the attribute can include an input vector. In one embodiment, the objective classification includes the presence or absence of muscle fascicle fracturing of the meat sample. In one embodiment the method can further comprise generating a notification using a notification system, wherein the notification can include the objective classification of the muscle fascicle fracturing of the meat sample. The method can further comprise accessing collected data for a data capture device, wherein the determining of the presence or absence of muscle fascicle fracturing is further controlled using the collected data. In some embodiments, the meat sample is a pork loin.

In a third embodiment, a method for determining muscle fascicle fracturing of a meat sample comprises providing a transport system and detecting when the meat sample on the transport system is within a field of view of a data capture device. The method can further include capturing an image of the meat sample on the transport system and extracting an attribute from the image of the meat sample. The method can further include processing the attribute using a detection model and determining an objective classification of the muscle fascicle fracturing of the meat sample. In some embodiments, the transport system is provided in the form of a conveyor belt. In some embodiments, the attribute includes an input vector. In some embodiments, the detection model includes an iteratively trained machine-learning model. In some embodiments, the objective classification includes an absence or presence of the muscle fascicle fracturing of the meat sample. In some embodiments, the method can further comprise generating a notification using a notification system, wherein the notification includes the objective classification of the muscle fascicle fracturing of the meat sample. In some embodiments, the data capture device can include a high-resolution camera.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

In the accompanying drawings, which form a part of the specification and are to be read in conjunction therewith in which like reference numerals are used to indicate like or similar parts in the various views:

FIG. 2A is a representative photograph of MFF present in a pork loin, suitable for identification and classification by the present invention;

FIG. 2B is a representative photograph of a pork loin without MFF present, suitable for identification and classification by the present invention;

DETAILED DESCRIPTION OF THE INVENTION

Figure 1:
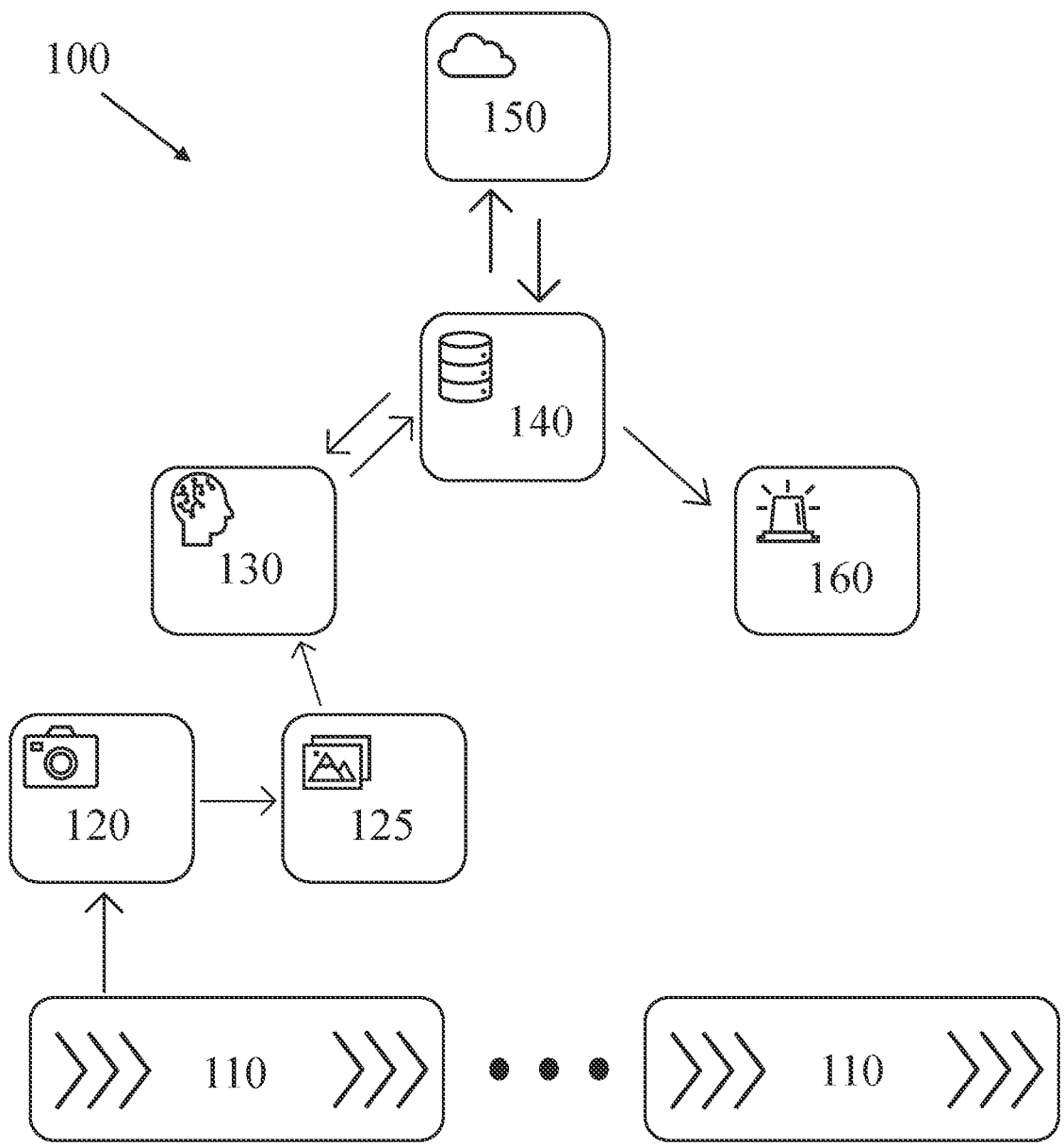
FIG. 1 is a block diagram of a system for determining muscle fascicle fracturing of a meat sample in accordance with an embodiment of the present invention.

Various embodiments of the present invention are described and shown in the accompanying materials, descriptions, instructions, and drawings. For purposes of clarity in illustrating the characteristics of the present invention, proportional relationships of the elements have not necessarily been maintained in the drawings.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. It will be appreciated that some or all of the various features and structures described and shown with respect to each of the specific embodiments referenced herein may be combined to form additional or alternative embodiments having such combinations and that such combinations are within the scope of the present invention.

Referring to the figures, one embodiment and aspect of the present invention is directed toward a system and method for developing an automated and intelligent MFF detection model for the objective classification of MFF in a meat cut. In one instance, the system and method are specifically adapted for detecting MFF in a pork loin to provide a classification of pass/fail for MFF in the meat cut. The system and methods described can also be used to iteratively train an MFF detection training model. The system can be designed to process and transform images from a data capture device and provide a classification based on the advanced analytic techniques of the detection training model. The system may then use an iteratively trained training model that can be updated and retrained based on updates to the images received from one or more data capture devices to provide enhanced detection and classification outputs.

As described in greater detail herein, the system and method of the present invention can allow for the identification and classification of MFF using an advanced objective evaluation of the meat sample. The output of the MFF detection model provides an objective pass/fail score. This in turn may allow for increased efficiencies, product quality, and processing resources. It will be understood that the systems and methods described herein may be utilized in connection with the processing of various cuts of various meat-producing animals including, but not limited to, hogs, beef cattle, lambs, and others.

FIG. 1 illustrates an MFF detection system 100 for use in identifying and classifying the MFF in a meat cut, as described herein. In various embodiments, the detection system 100 includes a networked system configured to perform one or more processes for advanced data processing and transforming data into an objective classification of MFF based on one or more parameters and tunable classification values. The MFF detection system 100 may include, but is not limited to, a conveyor belt system 110, one or more data capture devices 120, a plurality of data elements 125, one or more detection models 130, one or more databases 140, a network 150, and a notification system 160.

In various embodiments, the conveyor belt system 110 can be designed to transport meat samples (e.g., pork loin) through a meat processing system. According to some embodiments, the conveyor belt system 110 can be provided in the form of a roller system, a timing belt, an automated line system, a chain, a robotic system, or another form of a production line. It will be understood by those skilled in the art that the embodiments described herein that the conveyor belt system 110 may also include additional hardware and software components (not shown) including, but not limited to, sensing devices, controllers, switches, processors, etc. to facilitate the operation of a production line or similar. In some embodiments, the conveyor belt system 110 can communicate with or be integrated with the network 150 for the overall MFF detection system 100 to perform advanced analytics related to the productivity and efficiency of the production line. In another embodiment, the conveyor belt system 110 can be a transportation system for moving meat from one location to a second location. In another embodiment, the conveyor belt system can be communicatively coupled or otherwise integrated with the one or more data capture devices 120.

In various embodiments, the one or more data capture devices 120 can refer to a camera, image capture device, scanning device, or other sensing devices. In one embodiment, the one or more data capture devices 120 may include an image sensor system and/or an image data capture system. In one embodiment, the one or more data capture devices 120 may include a camera configured to obtain image data within a field. In one non-limiting example, the one or more data capture devices 120 may be configured to capture and/or retrieve the plurality of data elements 125, provided in the form of image files of meat on the conveyor belt system 110.

In one embodiment, the one or more data capture devices 120 can include a camera provided in the form of a semiconductor charge-coupled device (CCD), an active pixel sensor in a complementary metal-oxide-semiconductor (CMOS) integrated circuit, an active pixel sensor in N-type metal-oxide-semiconductor (NMOS, Live MOS) integrated circuit, a three-dimensional (3D) sensor, a line scanner, a hyperspectral camera, or any other digital image sensor, or any combination thereof. In some embodiments, the one or more data capture devices 120 are arranged so that a field of view of the one or more data capture devices 120 is directed toward a portion of the conveyor belt system 110 to capture data elements 125, including images, of one or more objects traveling on the conveyor belt system 110.

In some embodiments, the one or more data capture devices 120 can also include an electromagnetic energy source designed to emit electromagnetic energy into the field of view of the camera or other data capture device. In some embodiments, the electromagnetic energy source(s) are configured to emit electromagnetic energy in an X-ray range of wavelengths (e.g., electromagnetic energy having a wavelength between about 0.001 nm and about 10 nm), an ultraviolet range of wavelengths (e.g., electromagnetic energy having a wavelength between about 10 nm and about 400 nm), a visible range of wavelengths (e.g., electromagnetic energy having a wavelength between about 380 nm and about 760 nm), or an infrared range of wavelengths (e.g., electromagnetic energy having a wavelength between about 750 nm and about 1 mm). In some embodiments, the range(s) of wavelengths of the electromagnetic energy emitted by the electromagnetic energy source(s) is determined based on a desired characteristic of the image data obtained by the one or more data capture devices 120.

In one embodiment, the one or more data capture devices 120 may include an image sensor system. The image sensor system can include a presence detector system. In some embodiments, the presence detector system can be a photoelectric sensor (e.g., a photo eye). More specifically, in a non-limiting embodiment, the presence detector system can include a through-beam photoelectric sensor provided in the form of a transmitter and a detector. The transmitter can be designed to emit electromagnetic energy (e.g., infrared electromagnetic energy, visible electromagnetic energy, etc.) toward the detector. In this embodiment, the detector can be designed to detect the electromagnetic energy emitted by the transmitter. If the detector fails to detect the electromagnetic energy, the detector can generate a signal indicative of an object passing between the transmitter and the detector. In other embodiments, the presence detector system may be a through-beam photoelectric sensor that includes a transceiver in place of the detector and a reflector in place of the transmitter. In this alternative embodiment, the transceiver can emit electromagnetic energy toward the reflector, which reflects the electromagnetic energy to the transceiver. When a break in the electromagnetic energy is detected by the transceiver, the transceiver can generate a signal indicative of an object passing between the transceiver and the reflector. In other embodiments, the presence detector system may be a diffusing photoelectric sensor that is located on only one side of the transportation system and is capable of detecting the presence of an object on the conveyor belt system 110.

In one embodiment, the one or more data capture devices 120 can be connected to a computing device (not shown) through a high-speed cable linkage, such as USB 2, FireWire, or through cable linkage to an image capture card on the computer, high-speed wireless linkages (e.g., 802.1In), or other network connections described in connection with the network 150 below, or similar connection, or a combination thereof. In one embodiment, the one or more data capture devices 120 is communicatively coupled to a computing device (not shown) via the network 150. In some embodiments, the one or more data capture devices 120 can be designed to send the plurality of data elements 125 to the computing device via the network 150. In some embodiments, the one or more data capture devices 120 can be provided in the form of a camera or image sensor system with an integrated computing device, processor, or similar.

The one or more data capture devices 120 can be a red-green-blue (RGB) imager operating primarily in visible light, a NIR imager, a grayscale imager, or other imager that has one or more electronic imaging devices that output pixel intensity values in one or more ranges of the light spectrum. Furthermore, for an RGB imager in one embodiment, the imaging electronics can be a single chip with an interleaved array of RGB sensors, or three different monolithic red, green and blue chips can be utilized. As will be described below, the behavior of the RGB imager can be modified by different types of illumination or light filtering, such as from spectrum-limited illumination (as might be used, for example, in fluorescence imaging) or polarized illumination (e.g. for polarization imaging).

It will be appreciated that the use of multi-spectral imaging—e.g., obtaining images using imagers that can distinguish and image light at more than one wavelength—can obtain more information generally than imagers that are limited to one or a limited range of wavelengths, or a data capture device that treats a wide range of wavelengths identically (e.g. a grayscale imager).

In some embodiments the one or more data capture devices 120 is provided in the form of a high-megapixel camera, (e.g., generally with 6 million to 20 million or more pixels). This resolution can provide visibility to the ultrastructural features of the muscle (e.g., fascicles). In some embodiments, increased resolution may be used to view ultrastructural features of the muscle, such as muscle fibers and the surrounding endomysium and perimysium, for example. In one embodiment, the one or more data capture devices 120 are designed to distinguish physiologically important features at the level of muscle fibers and their components (e.g. muscle fiber core and endomysium).

In an embodiment where the one or more data capture devices 120 is a camera, and the plurality of data elements 125 are images or image files of meat, the resolution of an image can vary according to the distance of the camera from the surface of the meat. In this embodiment, a method for maintaining a relatively constant distance of the camera from the surface of the meat can be used to maintain a constant resolution in the images. Such a method may comprise either physical standoffs that can touch the meat, a motorized Z-axis carriage coupled with an electronic distance measuring device (e.g. via determining when an image is in focus, or determining when two non-parallel laser beams are coincident on the meat), or other distance maintenance and measuring techniques. It is preferable that the resolution of the image not vary more than 25% within an image or between images, and more preferable that the variation be less than 10% and most preferable that the variation be less than 5%. This effect can be somewhat reduced by using a narrow-angle lens and can be further reduced or eliminated by using a telecentric lens, which can be provided in the form of an object-space telecentric lens, in one non-limiting example. Alternatively, a size scale can be placed on the meat so that the images can be examined and scaled to correct for differences in resolution on the surface of the meat. In some embodiments, a reference (e.g., a size reference, a focus reference, a color reference, or similar) is to validate the image and to correct slight image-to-image changes in resolution.

In one embodiment, the one or more data capture devices 120 can be a color camera or a camera otherwise capable of capturing color or data elements with color aspects. In other embodiments, the one or more data capture devices may be a grayscale camera. An advantage of the grayscale camera is that generally, the density of pixels can be higher than that of a color camera. As will be discussed below, many of the features that are most useful in determining MFF rely only on intensity differences rather than color differences, although the use of color differences allows for a greater range of features to be used in the MFF decision algorithms. It is also within the spirit of the present invention that multiple cameras be used to image the meat, wherein one camera is a high-resolution grayscale camera, and the second camera is a much lower-resolution color camera that is capable of capturing an image of the entire meat surface. The image from the second color camera can be used for examining features of the meat involving color that is related to MFF.

In another example, a grayscale camera can be outfitted with color bandpass filters for different spectral bands, so the camera can obtain information from specific wavelengths. If multiple bandpass filters are sequentially passed over the lens, which can be arranged through the positioning of multiple bandpass filters on a rotating wheel, for example, multiple images of the same area of meat can be obtained from multiple wavelengths.

In one embodiment, the plurality of data elements 125 can include image files captured by the one or more data capture devices 120. In one embodiment, the plurality of data elements 125 can include images of the meat cuts on the conveyor belt system 110. In one embodiment, the meat cut is located on the conveyor belt system 110 within the field of view of the one or more data capture devices 120. In this embodiment, the one or more data capture devices 120 can be designed to capture the plurality of data elements 125, including but not limited to images, image files, video files, or a combination thereof. In some embodiments, the image files are minimally compressed to help enhance feature detection. In some embodiments, the image files may be compressed to improve image transfer speeds. It will be recognized by one skilled in the art that other types of data elements are contemplated within the scope of the embodiments described herein, including, for example, size, color, temperature, etc.

In one embodiment, the orientation of a surface of the meat with respect to the one or more data capture devices 120 should be roughly similar throughout the plurality of data elements 125 (e.g., from image to image). Given that the actual grain of the meat (i.e. the orientation of the individual muscle fibers) will vary from carcass to carcass, this generally means that cuts through the meat should be substantially consistent from animal to animal with respect to general anatomical features throughout processing. In one specific embodiment, the plurality of data elements 125 can include loin images or loin image files representing a variety of angles of the loin.

In some embodiments, the plurality of data elements 125 can include images of meat cuts taken with a high-resolution camera that can provide visibility of the ultrastructural features of the muscle. In one embodiment, multiple areas of the muscle can be imaged either sequentially by the same data capture device 120, or in parallel, by more than one data capture device 120 that is directed at different areas of the surface of the meat. In such cases, the methods of analysis described below can be analyzed roughly as if extracted from a single image.

In an embodiment where the plurality of data elements 125 are images of the surface of the meat, the illumination of the meat surface should be as even (e.g., consistent) as possible. In one embodiment, even illumination can be accomplished by placing an enclosure around the meat and the camera or the one or more data capture devices 120. The one or more sources of illumination (not shown) can be arrayed within the enclosure. The source(s) of illumination can be continuous, flash, or a combination thereof. Non-limiting examples of illumination sources include fluorescent lamps, LED arrays, flash lamps, arc lamps, and other lighting devices or lighting components. In some embodiments, inconsistency in the illumination of the meat surface can be mitigated or eliminated in the postprocessing of the meat images. Additionally, the methods described herein are relatively insensitive to variations in illumination and can still be used to detect features in the meat, including MFF, even when the illumination of the meat surface is not consistent. For example, in local binary patterns, pixel-to-pixel variations within a limited range of pixel distances can be examined, so that long-spatial-wavelength variations in illumination have limited effects on the analysis.

In some embodiments, techniques can be used to reduce glare on the surface of the meat. Glare on the surface of the meat can be a problem in image acquisition and is generally a more important issue than illumination uniformity. In one embodiment, the illumination source or the one or more data capture devices 120 (or both) can be outfitted with a polarization filter to reduce the amount of glare in the image or other data element 125. This can be particularly effective with point, near-point, or unidirectional illuminators. In another embodiment, the glare reduction technique can be provided in the form of highly diffuse illuminators.

In one embodiment, the data capture process (e.g., imaging) can be taken over a short period of time, since the object or meat, on which the measurements are taken are often moving continuously, and the cameras or other data capture devices 120 are fixedly positioned. In some embodiments, the one or more data capture devices 120 may be mounted or positioned using a movable apparatus, including a multi-directional track or adjustable axis device. In one example, exposure timing can be under 1 millisecond. In another embodiment, exposure timing can be under 50 milliseconds. In a third embodiment, exposure timing can be under 125 milliseconds. Techniques for decreasing exposure time can include, for example, increasing the illumination or by increasing a camera aperture.

In one embodiment, when the surface of the meat is prepared, it often has considerable variations in height (e.g., 3-5 mm relief). To maintain most or all of the surface of the meat in focus at one time, the depth of focus must be large enough to accommodate this relief. Therefore, the depth of focus should be at least 3 mm, and more preferable for the depth of focus to be at least 5 mm, and most preferable for the depth of focus to be at least 10 mm.

Returning to FIG. 1, in some embodiments, the plurality of data elements 125 can be analyzed using one or more detection models 130. In certain embodiments, one or more features are extracted from an image of the surface of the meat and analyzed using one or more detection models 130 to predict MFF. In certain embodiments, the plurality of data elements 125 is analyzed using one or more detection models 130 to predict MFF based on one or more parameters.

In one embodiment, MFF can be determined based on a lean surface of a pork loin. In one embodiment, a parameter for MFF can include visible perimysium boundaries and/or sagging fascicles. In another embodiment, a parameter for MFF can crack between fascicles, regardless of fascicle firmness.

In one embodiment, a parameter for the absence of MFF can be no visible perimysium boundaries and firm fascicles. In yet another embodiment, a parameter for the absence of MFF can be visible in perimysium boundaries and firm fascicles.

In certain embodiments, the one or more detection models 130 can be developed using a data minimization approach. In certain embodiments, the data minimization approach includes employing Akaike's Information Criterion. Other methods for data minimization are contemplated.

In certain embodiments, the one or more detection models 130 can include machine learning, artificial intelligence, a linear statistical model, a non-linear model, a logistic regression, a neural network, other processing models, other modeling and analysis techniques, or a combination thereof. In certain embodiments, the one or more models are created using AlexNet, GoogleNet, or other publicly available neural networks.

In certain embodiments, the one or more detection models 130 can be created using training data including data representative of light emitted from a plurality of meat samples upon application of an incident light to the meat sample, each sample meat having pre-determined values for the one or more parameters. In certain embodiments, the data can include spectral data which can be processed before analysis to reduce a number of data points across a spectral range.

The one or more detection models 130 are described in more detail with the processes described in connection to FIGS. 3 and 4.

In various embodiments, the one or more databases 140 generally refer to internal or external systems, data sources, scanning devices, or other platforms from which various data is received or collected. In one example, the one or more databases 140 can include the plurality of data elements 125, individual data points extracted therefrom, or other information processed, collected, or received by the MFF detection system 100. In some embodiments, the one or more databases 140 can be used to process, clean, map, triangulate, or validate data across the MFF detection system 100 or other embodiments of a networked MFF detection system.

The collected data stored in the one or more databases 140 can include the plurality of data elements 125, including images and image files, calibration data, parameter data, validation data, threshold data, etc. In at least one embodiment, the MFF detection system 100 receives or retrieves image data which may include but is not limited to: raw data points, pixels, vectors, measurements, or similar information. The information received or collected by the MFF detection system 100 can be stored in the one or more databases 140. In some embodiments, the one or more databases 140 can be provided in the form of a memory unit, processor, elastic cache system, cloud storage, or similar.

In some embodiments, the devices and aspects of FIG. 1 can communicate directly with one another over the network 150. The network 150 includes, for example, the Internet, intranets, extranets, wide area networks ("WANs"), local area networks ("LANs"), wired networks, a coaxial cable data communication network, an optical fiber network, a direct wired serial communication connection (e.g., USB), wireless networks, such as a WiFi network, a radio communication network, a cellular data communication network (e.g., 4G, 5G, LTE, etc.), a direct wireless communication connection (e.g., Bluetooth, NFC, etc.), or other suitable networks, or any combination of two or more such networks. For example, such networks can include satellite networks, cable networks, Ethernet networks, and other types of networks. In some embodiments, the network may be a private network (e.g., a private LAN), a public network (e.g., the internet), or a combination of private and/or public networks.

In some embodiments, the MFF detection system 100 can generate a prediction or classification of the presence or absence of MFF in a meat sample. The MFF detection system 100 can generate a notification via a notification system 160 to communicate a classification (e.g., pass/fail). In some embodiments, the notification system 160 can include a user interface, a communication interface, or a combination thereof.

In one embodiment, a user interface of the notification system 160 can be a computing device and can be in communication with one or more input or output devices (not shown) that are capable of receiving inputs into and/or outputting any outputs from the computing device or other aspects of the notification system 160. Embodiments of input devices can include but are not limited to, a keyboard, a mouse, a touchscreen display, a touch-sensitive pad, a motion input device, a movement input device, an audio input, a pointing device input, a joystick input, a keypad input, peripheral device, foot switch, or similar input device. Embodiments of output devices can include but are not limited to, an audio output device, a video output, a display device, a motion output device, a movement output device, a printing device, or a similar output device. In some embodiments, the user interface includes hardware that can be designed to communicate with one or more input devices and/or output devices via wired and/or wireless connections.

In some embodiments, the communications interface of the notification system 160 can be designed to communicate with various computing devices and/or networks, including communication over network 150. In some embodiments, the communications interface is capable of communicating data, content, and/or any other information, that can be transmitted, received, operated on, processed, displayed, stored, and similar. Communication via the communications interface may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, communication via the communications interface may be executed using a wireless data transmission protocol, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High-Speed Packet Access (HSPA), High-Speed Downlink Packet Access (HSDPA), IEEE 802.1 1 (WiFi), WiFi Direct, 802.16 (WiMAX), ultra-wideband (UWB), infrared (IR) protocols, near field communication (NFC) protocols, Wibree, Bluetooth protocols, wireless universal serial bus (USB) protocols, or any other wireless protocol.

In some embodiments, the MFF detection system 100 can also include or communicate with a computing device or computing environment (not shown). In some embodiments, the computing environment can be provided in the form of one or more computing devices, server banks, computer banks, a desktop computer, a laptop computer, a cellular telephone, a tablet, a phablet, a notebook computer, a distributed system, a gaming console (e.g., Xbox, Play Station, Wii), a watch, a pair of glasses, a key fob, a radio frequency identification (RFID) tag, an earpiece, a scanner, a television, a dongle, a camera, a wristband, a wearable item, a kiosk, an input terminal, a server, a server network, a blade, a gateway, a switch, a processing device, a processing entity, a set-top box, a relay, a router, a network access point, a base station, any other device configured to perform the functions, operations, and/or processes described herein, or any combination thereof. Such computing devices can be located in a single installation or may be distributed among many different geographical locations. In another embodiment, a controller, processor, or similar, may be used to implement aspects of FIG. 1 or otherwise execute program instructions related to the processes described herein.

Computing and other devices discussed herein can include a memory unit. A memory unit can comprise volatile or non-volatile memory to not only provide space to execute program instructions, algorithms, or the advanced analytics models described herein, but to provide the space to store the instructions, data, and other information. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

As shown in FIGS. 2A and 2B, in one embodiment, a high-resolution image is obtained of pork loin. FIG. 2A is a representative photograph of MFF in a pork loin. FIG. 2B is a representative photograph of a non-fractured pork loin. It will be recognized by one skilled in the art that various muscle types and types of meat cuts can be analyzed by the systems and processes disclosed herein. Thus, the detection methods described herein can be applied to different muscle types and meat cuts from the same carcass.

Figure 3:
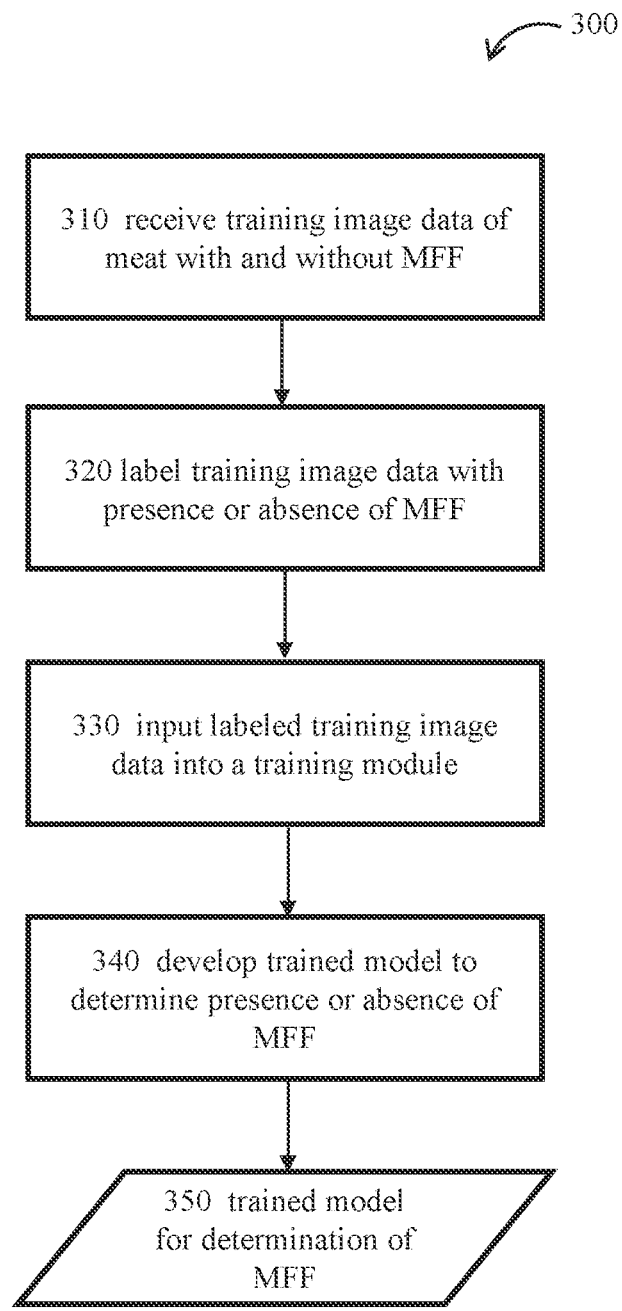
FIG. 3 is a flow diagram of a process for developing a trained model for determining the presence or absence of MFF in a meat cut in accordance with an embodiment of the present invention.
Figure 4:
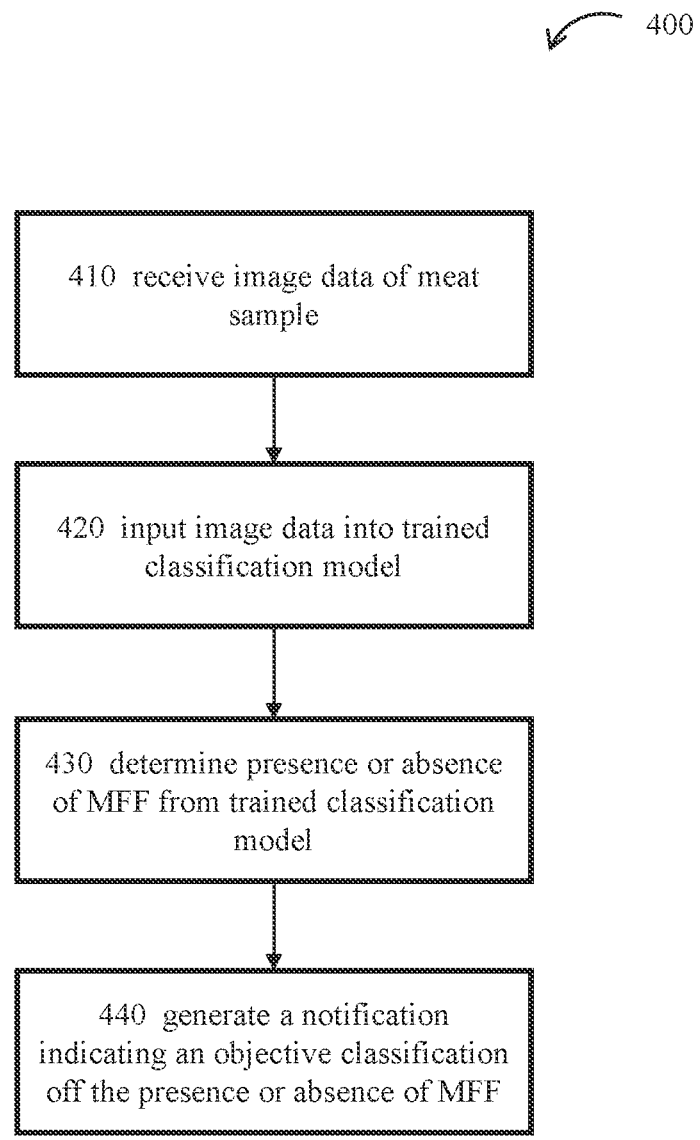
FIG. 4 is a flow diagram of a process for evaluating a meat sample as an input of the trained model for determining the presence or absence of MFF in the meat sample in accordance with an embodiment of the present invention.

FIGS. 3 and 4 are flow diagrams illustrating the training and operation of a one or more detection models 130, according to one representative embodiment. The process includes two main phases: iteratively training the one or more detection models 130 (FIG. 3) and inference (operation) of the one or more detection models 130 (FIG. 4).

When used throughout the present disclosure, one skilled in the art will understand that processes for "iteratively training the training module" can include machine learning processes, artificial intelligence processes, and other similar advanced machine learning processes. For example, the system and processes of the present disclosure can predict a pass/fail objective classification for a plurality of meat samples having different individualized parameters and can leverage the known characteristics of meat samples with similar metrics as an input to an iterative training process for an automated detection and objective classification of MFF based on a plurality of parameters.

As depicted in FIG. 3, in one embodiment, the iterative training process 300 for iteratively training the one or more detection models 130 begins with receiving or otherwise obtaining image data of meat cuts or samples with and without MFF 310. The image data will be labeled for presence or absence of MFF by visual inspection 320. In some embodiments, step 320 can be completed by a human. In another embodiment, the step 320 can be completed by an automated image processing or analysis system, a robotic system, an artificial intelligence system, or similar. In some embodiments, low-quality images (e.g., blurry, too dark, too bright, etc.) were excluded from the training image data. The labeled training image data can then be input into a training module 330. In some embodiments, the labeled training image can be validated by either manual or automated techniques before the input step 330. The labeled training image data is used to iteratively train or teach the model to identify MFF in a meat sample 340. After the training module, a trained model for determining the presence or absence of MFF is developed 350.

In some embodiments, to iteratively train the one or more detection models 130, the system can compare a set of training outcomes from each of a plurality of training data sets and update one or more emphasis guidelines, classification values, or other parameters. Additionally, in some embodiments, the comparison of the plurality of training data set outcomes can allow for the calculation of one or more error metrics between the input data and the output data. In at least one embodiment, the system can include a plurality of detection models 130, configured to generate outcomes, predictions, or classifications based on a particular data element characteristic. In some embodiments, the particular data element characteristic can include parameters related to the meat sample, type of carcass, or image capture considerations (e.g., illumination consistency, glare, color, etc.). The trained model can be implemented for determining the presence or absence of MFF in a meat sample as outlined in FIG. 4.

In some embodiments, a training module performs the iterative training of the one or more detection models 130. In some embodiments, the one or more detection models 130 can include an architecture with a certain number of layers and nodes, with biases and emphasis guidelines between the nodes. During training, the training module can determine the values of parameters weights and biases) of the machine learning model, based on a set of training samples. In one embodiment, the training module receives a training set for training. The training samples in the training set can include images captured by the camera. For supervised learning, the training set typically also includes tags or labels for the images. The tags or labels can include whether or not the meat sample has MFF.

In an example of iterative training, a training sample is presented as an input to the one or more detection models 130, which then produces an output for a particular attribute or parameter. The difference between the output of the one or more detection models 130 and a known output is used by the training module to evaluate and adjust (as needed) the values of the parameters in the one or more detection models 130. This is iteratively repeated for a plurality of training samples to improve the performance of the one or more detection models 130.

The training module can also validate the trained the one or more detection models 130 based on additional validation samples. For example, the training module applies the one or more detection models 130 to a validation sample set to quantify the accuracy of the one or more detection models 130. The validation sample set can include images with associated known attributes. The output of the one or more detection models 130 can be compared to the known attributes of the validation sample set. In one embodiment, developing the one or more detection models 130 can include using validation data to compare to training data to determine if the one or more detection models 130 was being overfit to the training data.

In one embodiment, metrics applied in accuracy measurement can include: Precision=TP/(TP+FP) and Recall=TP/(TP+FN), where TP is the number of true positives, FP is the number of false positives and FN is the number of false negatives. Precision can include how many outcomes the one or more detection models 130 correctly predicted had the target attribute (TP) out of the total that the model(s) predicted had the target attribute (TP+FP). Recall is how many outcomes the one or more detection models 130 correctly predicted had the attribute (TP) out of the total number of validation samples that did have the target attribute (TP+FN). The F score (F-score=2*Precision*Recall/(Precision+Recall)) unifies Precision and Recall into a single measure. Metrics applied in accuracy measurement can also include Top-1 accuracy and Top-5 accuracy. Under Top-1 accuracy, a trained detection model is accurate when the top-1 prediction (e.g, the prediction with the highest probability) predicted by the trained model is correct. Under Top-5 accuracy, a trained model is accurate when one of the top-5 predictions (e.g., the five predictions with the highest probabilities) is correct. In some embodiments, metrics applied in an accuracy calculation can include: accuracy=count correctly classified/total count.

The training module may use other types of metrics to quantify the accuracy of the trained detection model(s). In one embodiment, the training module trains the one or more detection models 130 until the occurrence of a stopping condition, such as an accuracy measurement indicates that the detection model is sufficiently accurate, or several training rounds have been completed.

A representative, non-limiting example of trained learning is shown in FIG. 4, in one embodiment, a trained image classification model may be developed and used in an MFF detection process 400 to determine the presence or absence of MFF in meat samples. First, image data of meat samples is received or otherwise collected 410. The image data of the meat sample may be received 410 by one or more data capture devices 120, such as a camera or other imaging device, as described in more detail in connection with FIG. 1. In some embodiments, the image data of the meat sample can be obtained while the meat is being transported by the conveyor belt system 110, or similar transport system.

In some embodiments, the image data includes image files, video files, or other data elements 125 as described in connection with FIG. 1. In some embodiments, the image data can include image files or video files of meat samples with or without MFF. In some embodiments, the image data capture system used to obtain the training image data (as described in connection with FIG. 3) is the same as the image data capture system that will be used to obtain image data of the meat samples after the trained image classification model is created. In some embodiments, low-quality images (e.g., blurry, too dark, too bright, etc.) were excluded from the image data. In some embodiment, the image data may be pre-processed, filtered, or otherwise analyzed, edited, or processed before step 420 or throughout other steps of the MFF detection process 400.

In some embodiments, the image data of the meat sample is input into a trained image classification model 420. The trained image classification model may be operating on a computing device, such as a local computing device at the image data capture system or a remote computing device from the local computing device. The trained image classification model can be designed to determine the presence or absence of MFF based on the image data. The trained image classification model analyzes the image data and makes a determination of the presence or absence of MFF 430.

In some embodiments, the determination of the presence or absence of MFF 430 may further include an indication of a degree of certainty as to the determination. In some embodiments, the indication of the degree of certainty can include a validation process and a calculation of an error metric.

In some embodiments, once the trained classification model makes the determination of an objective classification, the system can generate a notification 440. In some embodiments, the notification system 160 generates the notification. In some embodiments, the notification can be received by one or more display or other user interface devices. The notification may also be communicated via a communication interface to one or more external devices, communicated over the network 150, stored in one or more databases 140, or other output method. In one specific example, the determination of the MFF of the meat sample is communicated to a routing system that can be designed to route meat samples on a transportation system based on the presence or absence of MFF, such as routing particular meat samples to specific packaging stations and/or labeling stations.

In some embodiments, the trained model can be developed based on input vectors, which are indicative of a characteristic of the meat samples. In one example, the input vector may be the variation in the color of the pixels of the meat sample. In one example, the variation of the color may indicate a level of marbling of the meat sample. In other examples, the input vectors may be colors in the visible spectrum, peaks of wavelengths detected in non-visible electromagnetic energy (e.g., ultraviolet, infrared), the presence and numbers of different types of non-meat tissue (e.g., bone, fat), or any other number of possible input vectors or parameters.

In one embodiment, the input vector may be visible perimysium boundaries and sagging fascicles. In another embodiment, an input vector may crack between fascicles regardless of fascicle firmness. The use of input vectors for training may help the trained model identify the presence or absence of MFF in a meat sample without characteristics that a person would normally look for when manually identifying the type of the meat sample. The use of the input vectors allows the trained detection model to detect the type of the meat sample without the need to identify human-recognizable characteristics. After the input vectors are modeled, a trained detection model can be developed as a decision-making process based on a number of the input vectors. Examples of decision-making processes include decision trees, neural networks, and the like. In some embodiments, the decision-making process of the trained detection model is based on a determination of an acceptable arrangement of the input vectors in the decision-making process.

The trained model can be used during the detection process 400 (e.g., an operation that is not used to train the trained model) to identify the presence or absence of MFF in a meat sample. In some embodiments, as described in connection with FIG. 3, the trained model includes a neural network that has several layers. In one embodiment, the neural network is a multilayer neural network. In one embodiment and as a representative example, the neural network may include more or less than 25 layers, the first layer for RGB image input, and subsequent layers comprised of a combination of convolutional, cross-channel normalization, dropout, fully connected, grouped convolutional, max pooling, rectified linear unit, softmax, and classification output layers. In some embodiments, the input nodes represent inputs into the trained models (e.g., image data, metadata associated with the image data, etc.), one or more of the hidden nodes (e.g., one of the layers of hidden nodes) may represent one of the input vectors determined during the development of the model, and the output node represents the determined type of the meat being analyzed.

In one embodiment, the image data received for a meat sample may include multiple forms of image data about the same meat sample. For example, image data about a meat sample may include two images in the visible light range of the same meat sample. These multiple different forms of image data for the same meat sample may be passed through a trained model separately. If the trained detection model returns the same determination of MFF of the meat sample using the two different forms of image data, then the confidence level of the classification for that meat sample can be increased significantly. In one example, even though the confidence level using two images may be significantly higher than either of the images alone, the combined confidence level from two images may still be below a predetermined percentage of an acceptable degree of certainty (e.g., within a pre-defined threshold), which may cause the meat sample to be flagged for manual classification or other additional analysis techniques. It will be apparent that the number of multiple forms of image data is not limited to two but could be any number of forms of image data.

In embodiments, systems and methods and/or their components disclosed in this application, can include computing devices, microprocessors, modules, and other computer or computing devices, which can be any programmable device that accepts digital data as input, can be designed to process the input according to instructions or algorithms, and provides results as outputs. In an embodiment, computing and other such devices discussed herein can be, comprise, contain, or be coupled to a central processing unit (CPU) configured to carry out the instructions of a computer program. Computing and other such devices discussed herein are therefore configured to perform basic arithmetical, logical, and input/output operations.

In embodiments, the system or components thereof can comprise or include various modules or controllers, each of which is constructed, programmed, configured, or otherwise adapted, to autonomously carry out a function or set of functions. The term "controller" as used herein is defined as a real-world device, component, or arrangement of components implemented using hardware, or as a combination of hardware and software, such as by a microprocessor system and a set of program instructions that adapt the controller to implement the particular functionality, which (while being executed) transform the microprocessor system into a special-purpose device. A controller can also be implemented as a combination of the two, with certain functions facilitated by hardware alone, and other functions facilitated by a combination of hardware and software. In certain implementations, at least a portion, and in some cases, all, of a controller can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the controller using multitasking, multi-threading, distributed (e.g., cluster, peer-peer, cloud, etc.) processing where appropriate or other such techniques. Accordingly, each controller can be realized in a variety of physically realizable configurations, and should generally not be limited to any particular implementation exemplified herein, unless such limitations are expressly called out. In addition, a controller can itself be composed of more than one sub-controllers, each of which can be regarded as a controller in its own right. Moreover, in the embodiments described herein, each of the various controllers corresponds to a defined autonomous functionality; however, it should be understood that in other contemplated embodiments, each functionality can be distributed to more than one controller. Likewise, in other contemplated embodiments, multiple defined functionalities may be implemented by a single controller that performs those multiple functions, possibly alongside other functions, or distributed differently among a set of controllers than specifically illustrated in the examples herein.

Certain embodiments of the present disclosure provide software comprising a series of instructions executable by a processor to carry out a method as described herein. Certain embodiments of the present disclosure provide software for use with a computer comprising a processor and memory for storing the software, the software comprising a series of instructions executable by the processor to carry out a method as described herein.

The methods, systems, and apparatuses disclosed herein can be used to determine the presence or absence of MFF in a meat sample. In addition, the methods, systems, and apparatuses disclosed herein can be used to study and determine the causes of MFF in a meat sample. The methods, systems, and apparatuses disclosed herein can greatly increase the speed at which a meat sample can be evaluated for MFF, which can aid in studying the conditions that cause and contribute to MFF in a meat sample.

Various embodiments of systems, devices, and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations, locations, etc. have been described for use with disclosed embodiments, others besides those disclosed may be utilized without exceeding the scope of the invention.

Persons of ordinary skill in the relevant arts will recognize that the subject matter hereof may comprise fewer features than illustrated in any of the individual embodiments described above. The embodiments described herein are not meant to be an exhaustive presentation of how the various features of the subject matter herein may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical, or other property, such as, for example, molecular weight, viscosity, etc., is from 100 to 1,000, it is intended that all individual values, such as 100, 101, 102, etc., and sub-ranges, such as 100 to 144, 155 to 170, 197 to 200, etc., are expressly enumerated. For ranges containing values that are less than one or containing fractional numbers greater than one (e.g., 1.1, 1.5, etc.), one unit is considered to be 0.0001, 0.001, 0.01, or 0.1, as appropriate. For ranges containing single-digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure.

As used herein, "a," "an," or "the" can mean one or more than one. For example, "an" image can mean a single image or a plurality of images.

The term "and/or" as used in a phrase such as "A and/or B" herein can include both A and B; A or B; A (alone); and B (alone). Likewise, the term "and/or" as used in a phrase such as "A, B, and/or C" can include at least the following embodiments: A, B, and C; A, B, or C; A or C; A or B; B or C; A and C; A and B; B and C; A (alone); B (alone); and C (alone).

As used herein, the term "about" when referring to a measurable value such as an amount, a temporal duration, and the like, can include variations of +/−20%, more preferably +/−10%, even more preferably +/−5% from the specified value, as such variations are appropriate to reproduce the disclosed methods and systems.

As used herein, the term "meat" or "meat sample" as used herein can include a meat product, a meat cut, a trim specification, or other composition harvested from an animal.

As used herein, "muscle fiber" can include muscle filaments surrounded by a layer of connective tissue such as endomysium around a muscle fiber core.

As used herein, "lean muscle" can include tissue rich in muscle fiber. As used herein, "non-lean muscle" can include tissues with fat, gristle, nerve, blood vessels, or other connective tissue, etc.

As used herein, "statistical measures" can include the mean, the median, a percentile value, a variance, a standard deviation, or similar statistical measures, such as additional measures that can be derived from the above.

Features can include statistical measures. A feature can include one or a small number of values derived from the pixel values of the one or more data capture devices 120 and/or the plurality of data elements 125. In some embodiments, the features can include color features, topological features, physiological features (e.g. pH or protease levels), and more. In some embodiments, analysis of the feature can reduce the very large amount of information in an image (often millions of pieces of information, as an image can have millions of pixels, each with multiple intensity values) into a small number of values for use in a decision algorithm. In some embodiments, the analysis of one or more of the features can include "calculating" the features, "computing" the features, "extracting" the features, or other such actions connoting the derivation of the features from the underlying images. In some embodiments, the image analysis and/or extraction can be performed or executed by a computing device, or similar, as described herein.

As used herein, "texture analysis" can include a value or a small number of values that incorporate information about the fine-grained structure of an image. Such information can include local pattern analysis, pixel-to-pixel contrast analysis, and more.

As used herein, "local pattern analysis" can include both local binary patterns as well as numerous other algorithms that have similar or formally identical effects.

As used herein, "topological features" can include features related to the physical arrangement of ultrastructural elements, both in an absolute sense (e.g. a size, distance, or area) as well as relative sense (e.g. relative direction, relative size, relative distance, relative area).

As used herein "color values" can include hue, saturation, lightness, red value, green value, blue value, magenta value, cyan value, yellow value, Lab space value, L*a*b* space value, or any other value derived from obtaining images from specific spectral regions, and which can involve the comparison of such values.

As used herein, "muscle fiber ultrastructure" can include those features of the muscle fiber that relate to distinct parts of the muscle fiber, such as the muscle fiber core, the endomysium, and the perimysium.

As used herein, a "physiological state indicator" can include the application of a chemical indicator to the surface of the meat, where the indicator interacts with the meat structure or components to reveal some aspect of the meat's physiological state. Examples of such states can include the pH, calcium ion levels, or protease activities.

As used herein, "decision algorithms" can include any mapping or other process of assigning features from the high-resolution imaging, and which can additionally include values or attributes determined by means other than high-resolution imaging, into a meat MFF determination.

The constructions described in the accompanying materials and illustrated in the drawings are presented by way of example only and are not intended to limit the concepts and principles of the present invention. Thus, there has been shown, and described several embodiments of a novel invention. As is evident from the description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required." Many changes, modifications, variations, and other uses and applications of the present construction will, however, become apparent to those skilled in the art after considering the specification and the accompanying drawings. All such changes, modifications, variations, and other uses and applications which do not depart from the spirit and scope of the invention are deemed to be covered by the invention which is limited only by the claims which follow.

What is claimed is:

1. A muscle fascicle fracturing system designed to analyze a meat sample comprising:
    a data capture device provided in the form of a camera, wherein the camera is designed to capture one or more images of the meat sample;
    a transport system designed to move the meat sample through a meat processing production line, wherein the transport system is aligned with the camera such that the meat sample is positioned in a field of view of the camera;
    a detection model including a processor designed to process the one or more images received from the data capture device and determine an objective classification of a muscle fascicle fracturing of the meat sample; and a routing system designed to route the meat sample to a location in the production line based on the objective classification of the muscle fascicle fracturing of the meat sample.

2. The system of claim 1 further comprising a notification system designed to generate a notification provided in the form of the objective classification of the muscle fascicle fracturing of the meat sample.

3. The system of claim 1 wherein the objective classification includes a presence or an absence of muscle fascicle fracturing of the meat sample.

4. The system of claim 1 wherein the detection model includes an iteratively trained machine learning model.

5. The system of claim 1 wherein the detection model includes a training model, a validation model, and a trained model.

6. The system of claim 1 wherein the one or more images are provided in the form of high-resolution images of fascicles of the meat sample.

7. The system of claim 1 wherein the meat sample is a pork loin.

8. A method for determining muscle fascicle fracturing of a meat sample comprising:

capturing a data element provided in the form of an image of the meat sample as the meat sample is moving on a transport system of a production line;

extracting an attribute from the image of the meat sample;

processing the attribute using an iteratively trained training detection model;

determining an objective classification of the muscle fascicle fracturing of the meat sample; and routing the meat sample to a location of the production line based on the objective classification of the muscle fascicle fracturing of the meat sample.

9. The method of claim 8 wherein the attribute includes an input vector.

10. The method of claim 8 wherein the objective classification includes the presence or absence of the muscle fascicle fracturing of the meat sample.

11. The method of 10 further comprising accessing collected data for a data capture device, wherein the determining of the presence or absence of muscle fascicle fracturing is further controlled using the collected data.

12. The method of claim 8 further comprising generating a notification using a notification system, wherein the notification can include the objective classification of the muscle fascicle fracturing of the meat sample.

13. The method of claim 8 wherein the meat sample is a pork loin.

14. A method for determining muscle fascicle fracturing of a meat sample comprising:

providing a transport system designed to transport the meat sample along a production line;

detecting when the meat sample on the transport system is within a field of view of a data capture device using an image sensor;

capturing an image of the meat sample on the transport system when the image sensor detects the meat sample is within the field of view of the data capture device;

extracting an attribute from the image of the meat sample;

processing the attribute using a detection model;

determining an objective classification of the muscle fascicle fracturing of the meat sample; and routing the meat sample to a location in the production line based on the objective classification of the muscle fascicle fracturing of the meat sample.

15. The method of claim 14 wherein the transport system is provided in the form of a conveyor belt.

16. The method of claim 14 wherein the attribute includes an input vector.

17. The method of claim 14 wherein the detection model includes an iteratively trained machine learning model.

18. The method of claim 14 wherein the objective classification includes an absence or presence of the muscle fascicle fracturing of the meat sample.

19. The method of claim 14 further comprising generating a notification using a notification system, wherein the notification includes the objective classification of the muscle fascicle fracturing of the meat sample.

20. The method of claim 14 wherein the data capture device is a high-resolution camera.

* * * * *